(12) United States Patent
Mögele et al.

(10) Patent No.: US 9,770,867 B2
(45) Date of Patent: *Sep. 26, 2017

(54) METHOD AND MATERIAL SYSTEM FOR BUILDING MODELS IN LAYERS

(71) Applicant: VOXELJET AG, Friedberg (DE)

(72) Inventors: Florian Mögele, Gessertshausen (DE); Imke Nora Kellner, Braunschweig (DE)

(73) Assignee: VOXELJET AG, Friedberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,159

(22) Filed: Mar. 17, 2016

(65) Prior Publication Data

US 2016/0257073 A1 Sep. 8, 2016

Related U.S. Application Data

(63) Continuation of application No. 13/977,209, filed as application No. PCT/DE2011/002087 on Dec. 7, 2011, now Pat. No. 9,321,934.

(30) Foreign Application Priority Data

Dec. 29, 2010 (DE) .................. 10 2010 056 346

(51) Int. Cl.
| | |
|---|---|
| *B29C 67/00* | (2017.01) |
| *B33Y 10/00* | (2015.01) |
| *B33Y 70/00* | (2015.01) |
| *B05D 1/00* | (2006.01) |
| *C09D 133/12* | (2006.01) |
| *B29K 33/00* | (2006.01) |
| *B29K 77/00* | (2006.01) |
| *B29K 103/00* | (2006.01) |
| *B29K 105/00* | (2006.01) |

(52) U.S. Cl.
CPC ............ *B29C 67/0081* (2013.01); *B05D 1/00* (2013.01); *C09D 133/12* (2013.01); *B29K 2033/12* (2013.01); *B29K 2077/00* (2013.01); *B29K 2103/00* (2013.01); *B29K 2105/251* (2013.01); *B33Y 10/00* (2014.12); *B33Y 70/00* (2014.12); *Y10T 428/24802* (2015.01)

(58) Field of Classification Search
None
See application file for complete search history.

(56) References Cited

U.S. PATENT DOCUMENTS

| | | | |
|---|---|---|---|
| 143,613 A | 10/1873 | Bucklin | |
| 643,882 A | 2/1900 | McClave | |
| 951,665 A | 3/1910 | Swindell | |
| 1,356,837 A | 10/1920 | Stegmaier | |
| 1,421,896 A | 7/1922 | Benedict | |
| 1,535,341 A | 4/1925 | Riley | |
| 2,358,956 A | 9/1944 | Ashbaugh | |
| 2,388,805 A | 11/1945 | Stahl | |
| 2,390,154 A | 12/1945 | Kessler | |
| 2,640,629 A | 6/1953 | Thomson et al. | |
| 2,692,142 A | 10/1954 | Hunter | |
| 2,798,256 A | 7/1957 | Eynard | |
| 2,857,938 A | 10/1958 | Wahl | |
| 3,197,324 A | 7/1965 | Brooks | |
| 3,239,080 A | 3/1966 | Corompt | |
| 3,289,898 A | 12/1966 | Herman | |
| 3,291,233 A | 12/1966 | Mayer | |
| 3,377,001 A | 4/1968 | Hezard | |
| 3,616,969 A | 11/1971 | Koizumi | |
| 3,616,972 A | 11/1971 | Christy | |
| 3,646,595 A | 2/1972 | Williams | |
| 3,693,672 A | 9/1972 | Hiland | |
| 3,722,747 A | 3/1973 | Petit | |
| 3,762,014 A | 10/1973 | Klein | |
| 3,815,178 A | 6/1974 | Goldman | |
| 3,815,527 A | 6/1974 | Dobbins | |
| 3,858,628 A | 1/1975 | Bendle | |
| 3,879,339 A | 4/1975 | Richard | |
| 3,880,687 A | 4/1975 | Elmendorf | |
| 3,884,401 A | 5/1975 | Winkler | |
| 3,913,503 A | 10/1975 | Becker | |
| 3,935,339 A | 1/1976 | Cooke, Jr. | |

(Continued)

FOREIGN PATENT DOCUMENTS

| | | |
|---|---|---|
| AU | 720255 B2 | 5/2000 |
| DE | 3221357 A1 | 12/1983 |

(Continued)

OTHER PUBLICATIONS

US 4,937,420, 06/1990, Deckard (withdrawn)
International Search Report, Application No. PCT/DE2011/002087 dated Jun. 13, 2012.
International Preliminary Report on Patentability, Application No. PCT/DE2011/002087 dated Jul. 2, 2013.
Translation of Written Opinion of the International Searching Authority, Application No. PCT/DE2011/002087 dated Jun. 13, 2012.
Marcus et al., Solid Freedom Fabrication Proceedings, Nov. 1993.

(Continued)

*Primary Examiner* — Mary F Theisen
(74) *Attorney, Agent, or Firm* — The Dobrusin Law Firm, P.C.

(57) ABSTRACT

The present invention describes a method for building modes in layers, wherein a first material and subsequent thereto selectively a second material are applied in layers in a build space, and these two application steps are repeated until a desired model is obtained. The two materials form a solid object in a suitable mixing ratio, the first material including a particulate material and the second material being applied with the aid of a print head. The first material, the second material and/or the particulate material include one or more diamines and/or one or more dicarbonyl compounds as tree binder.

34 Claims, 1 Drawing Sheet

(56) References Cited

U.S. PATENT DOCUMENTS

| | | |
|---|---|---|
| 3,964,386 A | 6/1976 | Dini |
| 4,030,939 A | 6/1977 | Mallow |
| 4,203,674 A | 5/1980 | Laleman |
| 4,239,715 A | 12/1980 | Pratt |
| 4,247,508 A | 1/1981 | Housholder |
| 4,279,949 A | 7/1981 | Esser |
| 4,352,723 A | 10/1982 | Morgan |
| 4,369,025 A | 1/1983 | Von Der Weid |
| 4,455,111 A | 6/1984 | Jackson et al. |
| 4,456,154 A | 6/1984 | Herriman |
| 4,532,882 A | 8/1985 | Ciraud |
| 4,575,330 A | 3/1986 | Hull |
| 4,579,252 A | 4/1986 | Wilson |
| 4,591,402 A | 5/1986 | Evans et al. |
| 4,600,733 A | 7/1986 | Ohashi et al. |
| 4,610,218 A | 9/1986 | Johnson et al. |
| 4,630,755 A | 12/1986 | Campbell |
| 4,665,492 A | 5/1987 | Masters |
| 4,669,634 A | 6/1987 | Leroux |
| 4,711,607 A | 12/1987 | Wynosky et al. |
| 4,711,669 A | 12/1987 | Paul et al. |
| 4,726,715 A | 2/1988 | Steen et al. |
| 4,752,352 A | 6/1988 | Feygin |
| 4,752,498 A | 6/1988 | Fudim |
| 4,863,538 A | 9/1989 | Deckard |
| 4,876,294 A | 10/1989 | Shriver et al. |
| 4,889,433 A | 12/1989 | Pratt |
| 4,938,816 A | 7/1990 | Beaman et al. |
| 4,944,817 A | 7/1990 | Bourell et al. |
| 4,951,417 A | 8/1990 | Gerken et al. |
| 4,974,646 A | 12/1990 | Martin et al. |
| 4,976,296 A | 12/1990 | Pope |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,083,710 A | 1/1992 | McLoughlin et al. |
| 5,089,186 A | 2/1992 | Moore |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,178,496 A | 1/1993 | Trieb et al. |
| 5,182,170 A | 1/1993 | Marcus et al. |
| 5,193,722 A | 3/1993 | Groya et al. |
| 5,204,055 A | 4/1993 | Sachs et al. |
| 5,213,271 A | 5/1993 | Uribe et al. |
| 5,216,616 A | 6/1993 | Masters |
| 5,221,539 A | 6/1993 | Pallerberg et al. |
| 5,229,209 A | 7/1993 | Gharapetian et al. |
| 5,248,456 A | 9/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,275,215 A | 1/1994 | Derby |
| 5,284,695 A | 2/1994 | Barlow et al. |
| 5,296,062 A | 3/1994 | Bourell et al. |
| 5,311,921 A | 5/1994 | Smets |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,433,520 A | 7/1995 | Adams |
| 5,482,659 A | 1/1996 | Sauerhoefer |
| 5,490,962 A | 2/1996 | Cima et al. |
| 5,503,785 A | 4/1996 | Crump et al. |
| 5,505,567 A | 4/1996 | Scott |
| 5,506,607 A | 4/1996 | Sanders, Jr. et al. |
| 5,518,060 A | 5/1996 | Cleary et al. |
| 5,518,680 A | 5/1996 | Cima et al. |
| 5,554,330 A | 9/1996 | Flannery et al. |
| 5,555,176 A | 9/1996 | Menhennett et al. |
| 5,573,055 A | 11/1996 | Melling et al. |
| 5,573,721 A | 11/1996 | Gillette |
| 5,582,231 A | 12/1996 | Siak et al. |
| 5,589,222 A | 12/1996 | Thometzek et al. |
| 5,597,589 A | 1/1997 | Deckard |
| 5,599,581 A | 2/1997 | Burton et al. |
| 5,601,868 A | 2/1997 | Gerhardt |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,681,132 A | 10/1997 | Sheppard, Jr. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,843,513 A | 12/1998 | Wilke et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,964,985 A | 10/1999 | Wootten |
| 5,965,170 A | 10/1999 | Matsuoka et al. |
| 5,989,476 A | 11/1999 | Lockard et al. |
| 6,007,318 A | 12/1999 | Russell et al. |
| 6,036,777 A | 3/2000 | Sachs |
| 6,037,389 A | 3/2000 | Archibald et al. |
| 6,041,993 A | 3/2000 | Matsuo et al. |
| 6,042,774 A | 3/2000 | Wilkening et al. |
| 6,048,188 A | 4/2000 | Hull et al. |
| 6,048,954 A | 4/2000 | Barlow et al. |
| 6,094,994 A | 8/2000 | Satake et al. |
| 6,116,517 A | 9/2000 | Heinzl et al. |
| 6,120,231 A | 9/2000 | Christ et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,227,769 B1 | 5/2001 | Wilson et al. |
| 6,258,170 B1 | 7/2001 | Somekh et al. |
| 6,259,962 B1 | 7/2001 | Gothait |
| 6,270,335 B2 | 8/2001 | Leyden et al. |
| 6,286,585 B1 | 9/2001 | Twardowska et al. |
| 6,305,769 B1 | 10/2001 | Thayer et al. |

(56) References Cited

U.S. PATENT DOCUMENTS

| | | |
|---|---|---|
| 6,316,060 B1 | 11/2001 | Elvidge et al. |
| 6,318,418 B1 | 11/2001 | Grossmann et al. |
| 6,322,728 B1 | 11/2001 | Brodkin et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,464,208 B1 | 10/2002 | Smith |
| 6,467,525 B2 | 10/2002 | Herreid et al. |
| 6,476,122 B1 | 11/2002 | Leyden |
| 6,485,831 B1 | 11/2002 | Fukushima et al. |
| 6,497,259 B1 | 12/2002 | Wegman |
| 6,500,378 B1 | 12/2002 | Smith |
| 6,552,130 B1 | 4/2003 | Makino et al. |
| 6,554,600 B1 | 4/2003 | Hofmann et al. |
| 6,582,613 B2 | 6/2003 | Mooneyham |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,682,030 B2 | 1/2004 | Santoro et al. |
| 6,713,125 B1 | 3/2004 | Sherwood et al. |
| 6,719,506 B2 | 4/2004 | Chang et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,818,062 B2 | 11/2004 | Tomaru et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 6,999,459 B1 | 2/2006 | Callon et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,137,759 B1 | 11/2006 | Ambs |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,290,348 B2 | 11/2007 | Katamachi |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeifer et al. |
| 7,431,987 B2 | 10/2008 | Pfeifer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,475,796 B2 | 1/2009 | Garton |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeifer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höchsmann et al. |
| 7,807,077 B2 | 10/2010 | Ederer et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,039,059 B2 | 10/2011 | Ishihara |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,568,124 B2 | 10/2013 | Brunermer |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 * | 4/2016 | Mogele ............ B29C 67/0081 |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |

(56) References Cited

U.S. PATENT DOCUMENTS

| | | |
|---|---|---|
| 2005/0212163 A1 | 9/2005 | Bausinger et al. |
| 2005/0218549 A1 | 10/2005 | Farr |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| DE | 3930750 C2 | 3/1991 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102006038858 A1 | 2/2008 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| EP | 361847 B1 | 4/1990 |
| EP | 0431924 A2 | 6/1991 |
| EP | 1415792 | 5/2004 |
| FR | 1497414 A | 10/1967 |
| JP | S62275734 A | 11/1987 |
| JP | 2003136605 A | 5/2003 |
| JP | 2004082206 A | 3/2004 |
| WO | 01/40866 A2 | 6/2001 |
| WO | 0168375 A2 | 9/2001 |
| WO | 01/78969 A2 | 10/2001 |
| WO | 2004/014637 A1 | 2/2004 |
| WO | 2005/113219 A1 | 12/2005 |
| WO | 2008/049384 A1 | 5/2008 |
| WO | 2008061520 A2 | 5/2008 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015078430 A1 | 8/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |

(56) References Cited

FOREIGN PATENT DOCUMENTS

WO    2016101942 A1    6/2016
WO    2016146095 A1    9/2016

OTHER PUBLICATIONS

Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary dated Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, pp. 2-15.

\* cited by examiner

METHOD AND MATERIAL SYSTEM FOR BUILDING MODELS IN LAYERS

This application is a continuation patent application of U.S. patent application Ser. No. 13/977,209 having a 371(c) date of Jul. 31, 2013. U.S. patent application Ser. No. 13/977,209 is a national phase filing under 35 USC §371 from PCT Application serial number PCT/DE2011/002087 filed on Dec. 7, 2011, and claims priority therefrom. This application further claims priority from German Patent Application Number DE 10 2010 056 346.3 filed Dec. 29, 2010. PCT/DE2011/002087 and DE 10 2010 056 346.3 and U.S. Ser. No. 13/977,209 are all incorporated herein by reference.

The invention relates to a method for building models in layers as well as to material systems for use in methods of this type.

Generative methods for producing 3D structures have long been known (for example, from EP 0 431 924 B1 or WO200168375A2).

This includes, among other things, stereo lithographic methods (solidification of monomeric liquids using a high energy beam), selective laser sintering (melting particulate material using a high energy beam) and 3D printing. All aforementioned methods permit the comparatively economical manufacture of molds for building prototypes. When printing devices are equipped with multiple controllable nozzles, 3D printing permits building speeds that are superior to all other methods. Its application is therefore not limited to prototypes. Even series-produced components may be produced economically.

In principle, different methods may be derived from the prior art: systems that are entirely liquid-based and systems that use powder materials, which are selectively solidified by the introduction of liquid.

The first of these systems, which are entirely liquid-based, are known, for example, from U.S. Pat. No. 6,259,962 of Objet Geometries Ltd. This method is based on the fact that two different materials are generated during solidification. The model produced in layers may then be removed from the support material after printing process with the aid of a dissolving method—for example, a water bath.

Solidification of the materials, which were initially fluid for printing, may take place, for example, using UV radiation. In addition, two-component or multicomponent systems may be used, which are brought together and solidified on the building platform. However, since the complete building volume must be generated with the aid of ink-jet printers, this method is comparatively slow and therefore suitable only for small components.

The methods for building models in layers which use particulate material are a much more economical alternative, in particular with regard to time intensity. In these methods, a powdered material is selectively bonded. The particulate material is applied in thin layers and smoothed on a workpiece platform, for example using a coater. A print head solidifies selective areas on the powder layer on the basis of component data stored in the computer. This process continues to be repeated until the component is finished and may be removed from the unbound particulate material.

One advantage of this approach is that part of the component material is already provided by the volume of the particulate material. The amount that must be dispensed in liquid form is therefore comparatively small. As a result, this method permits high print head speeds, short layering times and a—comparatively-simple print head structure.

In this case, the particulate material is solidified by the bonding of individual particles to each other.

Polymerizing systems have proven to be particularly successful here, since material does not need to be removed from the molding once it has been applied. In this regard, there is no danger of shrinkage and therefore material distortion. Secondly, polymerizing adhesives are known for their strong bonding forces.

The following main groups, which are suitable for a process of this type, may be essentially derived from the prior art:
Epoxy resin systems
Polyurethane systems
Melamine resin systems
Unsaturated polyester
2K silicone
Radically polymerizing systems (RPS)
Novolak systems RPS systems are frequently used. Many monomers exist which meet the requirements of the processes and the droplet generators. With few exceptions, the other aforementioned systems do not meet the requirements of the droplet generators.

Starting the reaction is problematic with the RPS systems. A component must be liquid for processing in droplet generators. This component must begin to solidify only when it is dispensed onto the powder. For this purpose, a component must be present in the powder, which triggers the start of the reaction.

In principle, there are two ways to maintain this component in the powder. Either the powder is a mixture of different particles, or the component is contained in the particles. Dibenzoyl peroxide may be used as the initiator component in RPS. As a pure substance in powdered form, it is a source of danger. It tends to explode under mechanical impact. Mixing it into the base powder is therefore critical.

So-called bead polymerizates, in which peroxide is present in the individual particulates, present a second possibility. A powder of this type is not at all critical in its handling. However, the fact that the initiator component must be released only by being dissolved from the base component greatly limits the binder selection. Many compromises must be accepted.

Another characteristic inherent to RPS is that the binder tends toward oxygen inhibition. In this case, the polymerization is inhibited by the oxygen present in the air. As a result, the adhesive strength is greatly reduced upon entering the air. This poses a considerable problem, particularly in 3d printing, in which large effective surfaces occur as a result of the process. Catalysts are added so that the reaction may take place at room temperature. These catalysts often pose a substantial health risk.

The object of the invention is therefore to provide, in different aspects, a method, a binder and a material system for building models in layers which do not have the disadvantages of known 3D printing methods, in particular RPS, or at least which reduce or fully overcome the disadvantages of the prior art.

The object is achieved by the embodiments described in greater detail in the claims.

In one aspect, the invention relates to a method for building models in layers, wherein a first material and subsequent thereto selectively a second material are applied in layers in a build space, and these two application steps are repeated until a desired model is obtained; the two materials form a solid body in a suitable mixing ratio; the first material contains a particulate material; and the second material is applied with the aid of a print head; and wherein the first material, the second material and/or the particulate material include(s) one or multiple diamines and one or more dicarbonyl compounds as the binder.

In another aspect, the invention relates to a use of one or multiple diamines and one or multiple dicarbonyl compounds in a method for building models in layers.

In another embodiment of this aspect, the invention relates to a use of one or multiple diamines and one or multiple dicarbonyl compounds for building models in layers, wherein a particulate material and subsequent thereto selectively one or multiple diamines and/or one or multiple dicarbonyl compounds are applied in layers in a build space with the aid of a print head, and these two application steps are repeated until a desired model is obtained.

In another aspect, the invention relates to a material system for building models in layers, comprising a first material and a second material, wherein one of the materials includes a particulate material and one of the materials includes one or multiple diamines and/or one of the materials includes one or multiple dicarbonyl compounds.

In another embodiment of this aspect, the invention relates to a materials system for building models in layers, wherein a first material and subsequent thereto selectively a second material are applied in layers in a build space, and these two application steps are repeated until a desired model is obtained; the two materials form a solid body in a suitable mixing ratio; the first material contains a particulate material; and the second material is applied with the aid of a print head, wherein the composition comprising the first and second materials and possibly the particulate material includes one or multiple diamines and one or multiple dicarbonyl compounds.

In another aspect, the invention relates to a solid body, manufactured by means of a method according to the invention, according to a use according to the invention or with the aid of a material system according to the invention.

The disadvantages of the prior art are overcome, or these disadvantages are at least mitigated, by means of the invention. Moreover, different advantages in the manufacture of three-dimensional models or components result from the invention.

Figure 1:
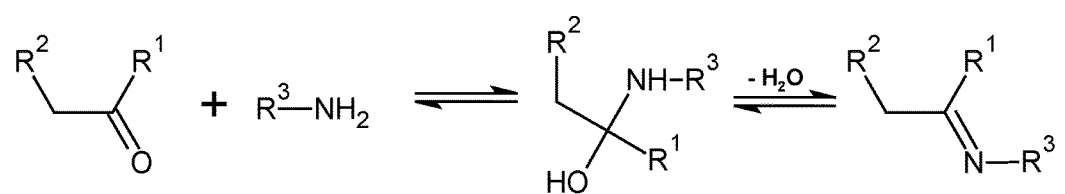
FIG. 1 illustrates features of an equilibrium chemical reaction.

Among other things, the fact that the invention provides an advantageous, two-component binder system, which permits peroxide-free, selective bonding of the individual layers in a polycondensation reaction, should be mentioned. In this case, two components—at least one diamine and at least one dicarbonyl compound—are caused to react. Both components are available and may be used in both liquid and solid form.

Since the method according to the invention, in which the composition according to the invention is to be used, provides a liquid and a powdered component (solid component), this results in a certain variety of embodiments which are, in principle, different:

1. The diamine and the dicarbonyl compound are both present in solid form in the powder component. The liquid component brings both components into solution after printing and facilitates the reaction.
2. A liquid diamine is applied to a powder which contains a dicarbonyl compound.
3. A liquid dicarbonyl compound is applied to a powder which contains a diamine.
4. A solid diamine is placed in a carrier solution and applied to a powder having a dicarbonyl compound.
5. A solid dicarbonyl compound is placed in a carrier solution and applied to a powder having a diamine.

To optimize the reaction in the method, use and material system according to the invention, liquid and solid reactants may also be combined, whereby only the separation of the reactants is crucial.

In addition, different substances (for example, different diamines and/or different dicarbonyl compounds) may be mixed. The solid component is always a mixture of a base material and the reagent used depending on the system. For example, PMMA in the form of a bead or emulsion polymerizate may be used as the base material. Since this component is not required for the reaction, however, a wide range of organic and inorganic materials may be used.

"Building models in layers" may be understood to mean any method in which thin layers are applied to each other in a cyclical manner and are subsequently solidified in the desired manner according to predefined data. 3D printing is used according to the invention. Working with a radically polymerizing system (RPS) is particularly preferred. Solid models and components may thus be obtained.

The invention is used in "three-dimensional printing methods," "3D printing methods," or "methods using a layering technique."

In 3D printing, methods which are used according to the invention, nozzles are used to apply material in the form of droplets, and these nozzles are customarily combined in print heads. Print heads used in 3D printing methods of this type usually comprise multiple components. So-called print modules, which have a limited number of individually controllable nozzles, form a key element thereof. The nozzles operate according to a drop-on-demand principle, customarily with the aid of piezoelectric actuators which cause one droplet to be discharged from each controlled nozzle upon the application of a corresponding current pulse. The droplets are relatively small and some of them have diameters of less than 50 µm.

In addition to the electrical connections, the print modules also have a fluid supply line which usually leads to a fluid reservoir, which is preferably located above the nozzles. The print modules are located in a receptacle which permits multiple modules to be aligned with each other.

It is apparent from the size of the droplets that the deviation of the nozzle positions in relation to each other must, in each case, be much less than the droplet diameter and is therefore usually only a few micrometers. A receptacle should therefore have a design which is as rigid as possible in order to statically and dynamically maintain a precise position of the print modules once this position has been selected.

The individual method steps, uses or the material system according to the invention are carried out or used, according to the invention, in a build space.

Working on a building platform which preferably has lateral limits and into which the necessary materials are introduced, is particularly preferred. All devices known for 3D printing may be used in the invention. Particularly preferred building platforms are the VX500 or VX800 (Voxeljet Technology GmbH, Friedberg).

All materials known in 3D printing which may be combined with the invention may be used as materials.

Depending on the embodiment, "binder" is understood to be the combination of at least one diamine and at least one dicarbonyl compound in a solid, liquid or dissolved form, whereby a polyamine forms in the powder bed which bonds the powder particles to each other and helps solidify the component in this manner. Another variant of the binder comprises dissolved diamine and/or dissolved dicarbonyl compound. In particular embodiments, this may also be understood to be the solvent which is used to facilitate the polymerization reaction and thus achieve the formation of a solid body.

Any 3-dimensional form based on, for example, predefined 3D computer data, may be obtained as the "model", "solid body" or "component." The solid bodies obtained are either models or prototypes or finished, usable components. The solid bodies may be subjected to additional operations.

"A suitable mixing ratio" is understood to be any mixing ratio of the materials and additional substances and components used, such as solvents, for the purpose of obtaining a solid body in a method for layered construction. Equimolar mixing ratios with regard to the number of carbonyl functions as opposed to the total number of amine functions, are preferably used. In one particularly preferred embodiment, a slight excess of amine component(s) is used.

In preferred embodiments of the method according to the invention, the solid body remains in a powder bed under environmental conditions for 5 to 24 hours, preferably for 8 to 12 hours, particularly preferably for 10 to 11 hours after the final applied layer has been printed.

In an additional step, the solid body may be subjected to heat treatment. The solid body is preferably stored at 40° C. to 60° C., preferably at 50° C. to 60° C. for 3 to 7 hours, more preferably for 4 to 6 hours.

The first material in the reaction preferably contains non-participating organic and/or inorganic substances.

"Non-participating organic and/or inorganic substances" are understood to be, for example, substances or substance mixtures which are suitable for facilitating a solid body in the method, the use and the material system according to the invention.

A particulate material containing PMMA (polymethyl methacrylate) or a powder based on PA (polyamide), for example Vestosint® (Degussa AG), Ultramid® (BASF SE) or Innov́ PA (Exceltec sarl), may preferably be used as the first material.

In one preferred embodiment, the second material is an atomizable solution which contains diamines or dicarbonyl compounds. In another preferred embodiment, the atomizable solution contains neither of these two substances. The diamine and carbonyl compound or multiple diamines or carbonyl compounds are contained or included in the first material in this embodiment.

An "atomizable solution" is understood to be any solution or any fluid which may be selectively applied with the aid of nozzles to a defined location in a defined dose. Examples of "atomizable solutions" are the solvents used in the invention.

In one preferred embodiment, the second material may bring diamines or dicarbonyl components into solution in a solid phase.

"To bring into solution in a solid phase" is understood to mean that the at least one diamine and/or the at least one dicarbonyl compound is present in the solid phase, and the second material is selected in such a way that it is able to bring diamines and dicarbonyl compounds into solution.

In one preferred embodiment, the second material is a solvent, preferably a solvent mixture. It may preferably be a polar solvent. Aliphatic and aromatic alcohols and esters are preferably used, particularly preferably propanol, butanol, hexanol, benzyl alcohol, ethyl acetate and hexyl acetate.

An excess amount of one of the two components may be present after the processing compound has been added via the print head. The two components are particularly preferably present in an equimolar ratio. The two components comprise either pure substances or a mixture of corresponding substance classes. A solvent mixture including or comprising 50 wt % benzyl alcohol, 25 wt % hexyl acetate and 25 wt % 2-propanol is particularly preferred.

The diamine and dicarbonyl compound may be present in any suitable form that makes them usable in the invention, the diamine and dicarbonyl compound being preferably present in the second material. The second material particularly preferably contains one or multiple diamines and/or one or multiple dicarbonyl compounds in the liquid or solid phase.

All known components that are compatible with the other components and substances which may be used according to the invention may be used as dicarbonyl compounds. In one preferred embodiment, the dicarbonyl compounds are replaced or supplemented by metal salts of dicarbonyl compounds.

For example, the following "metal salts" of dicarbonyl compounds may be used, particularly preferably "metal salts" of acetylacetone: zinc acetylacetonate, manganese acetylacetonate, preferably copper acetylacetonate, iron(II) acetylacetonate and iron(III) acetylacetonate.

The condensate of the reaction is preferably removed from the system with the aid of hygroscopic substances. The printing process may furthermore be carried out at an elevated temperature, or an oven process may be subsequently carried out, or both, in order to enhance the removal of the condensate.

Moreover, catalytic quantities of protons in the form of organic acids may be used to optimize the reaction. Lewis acids are conceivable as alternative catalysts.

The substances and components used according to the invention may be present in any suitable form. The diamine and/or the dicarbonyl compound is/are preferably present in a carrier solution.

Aliphatic and aromatic alcohols and esters may preferably be used as the "carrier solution," particularly preferably propanol, butanol, hexanol, benzyl alcohol, ethyl acetate and hexyl acetate.

In preferred embodiments, the diamine is selected from the group comprising primary diamine alkanes, preferably diaminododecane, diaminohexadecane, and polyamines, preferably spermine, and aromatic diamines, preferably phenylenediamine, diaminobenzoic acids, particularly preferably 3,5-diaminobenzoic acid, and liquid diamines, preferably ethylenediamine, propylenediamine and/or spermidine.

The diamine is preferably present in a quantity of 5 to 15 wt %, preferably 8 to 12 wt %, particularly preferably 10 wt % in relation to the total quantity.

"Total quantity" is understood to be the sum of the masses of the base material (PMMA or PA) and the active component in the powder.

The dicarbonyl compound is preferably selected from the group comprising diketone compounds and their metal complexes, in particular the liquid acetylacetone under process conditions and 2,5-hexandione, copper(II) acetylacetonate, iron(III) acetylacetonate in solid form, and liquid dialdehydes, preferably glyoxal, glutaraldehyde, and the solids phthaldialdehyde, isophthaldialdehyde and terephthaldialdehyde.

The binder content is preferably between 5 wt % and 40 wt %, preferably between 8 wt % and 15 wt %, particularly preferably between 9 wt % and 11 wt %.

The invention furthermore relates to a solid body, manufactured by means of a method according to the invention, according to a use according to the invention or with the aid of a material system according to the invention.

A solid body according to the invention preferably has a solidity of 6 to 8 MPa, particularly preferably 6 to 7 MPa, and/or a modulus of elasticity of 700 to 950 MPa, particularly preferably 750 to 900 MPa.

The invention is illustrated in preferred embodiments in the following examples.

EXAMPLES

1. Description of the Basic Chemical Reaction

Figure 2:
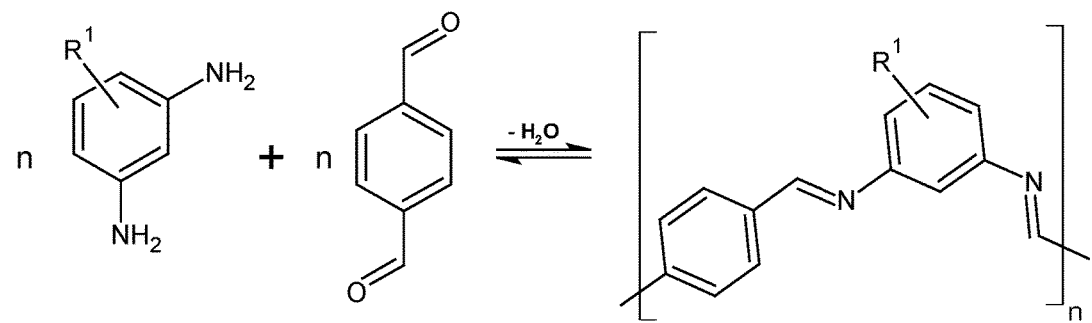
FIG. 2 illustrates features of a reaction of a diamine and a dicarbonyl compound.

The reaction takes place between a diamine and a dicarbonyl compound in a condensation reaction, forming a poly-Schiff base in the dissolved phase. A nucleophilic attack on the carbonyl compound by the nitrogen takes place, and a semiaminal results as the intermediate product, which is then converted to imine by water elimination. This reaction represents an equilibrium reaction, the establishment of which may be accelerated by adding catalytic quantities of protons and which may be shifted to the polymer side by removing the condensation product. FIG. 1 is an illustrative representation of a Schiff base comprising a ketone (R1=C) or an aldehyde (R1=H) and a primary amine with the aid of water elimination, FIG. 2 is an illustrative representation of a poly-Schiff base comprising a diamine and a dialdehyde with the aid of water elimination.

2. Preferred Substances Used

PMMA is particularly preferably used as the base material. PA-based powder (Vestosint®) is likewise preferably used.

Aliphatic and/or aromatic diamines may be added to the base powder as the solid. Primary diamine alkanes such as diaminododecane, diaminohexadecane are preferably used, or polyamines such as spermine, aromatic diamines such as phenylenediamine, diaminobenzoic acids, particularly preferably 3,5-diaminobenzoic acid.

Ethylenediamine, propylenediamine, spermidine are preferred as liquid diamines. Diketone compounds and their metal complexes are preferably used as dicarbonyl compounds, in particular liquid acetylacetone under process conditions and 2,5-hexandione, copper(II) acetylacetonate, iron(III) acetylacetonate in solid form, preferably liquid dialdehyde, in particular glyoxal, glutaraldehyde, particularly preferably the solids phthaldialdehyde, isophthaldialdehyde and terephthaldialdehyde.

The component processed via the print head is processed either as a pure substance or in dissolved form. Aliphatic and aromatic alcohols and esters are preferably used as solvents, particularly preferably propanol, butanol, hexanol, benzyl alcohol, ethyl acetate and hexyl acetate. An excess amount of one of the two components may be present after the compound processed via the print head been added; the two components are particularly preferably present in an equimolar ratio. The two components comprise either pure substances or a mixture of corresponding substance classes.

3. A System Having Liquid Diketone 0.6 kg of 3,5-diaminobenzoic acid (10 wt % in relation to the total quantity) are mixed into 5.4 kg of a PMMA of the M546 type for approximately 1.5 hours, using a ball mill, until a homogeneous mixture is obtained. The mill balls are then sifted. As the liquid component, 2,5-hexandione is used as the binder.

Following the preparations, the materials are processed in a 3D printer. The added binder is between 5 wt % and 40 wt %, preferably between 8 wt % and 15 wt %, particularly preferably between 9 wt % and 11 wt %.

The components remain in the powder bed under environmental conditions for 5 to 24 hours after the final applied layer has been printed. They may then be safely removed from the powder bed without any deformation.

The components are then stored at 40° C. to 60° C. for 3 to 7 hours, preferably for 4 to 6 hours. Solidities on the PMMA base material of 7 MPa and a modulus of elasticity of 900 MPa have been measured. The body achieved in this manner is porous.

4. A System Having Solid Reactants

Both material components are present in the powder bed and are printed with a solvent or a solvent mixture.

0.6 kg of 3,5-diaminobenzoic acid and 0.53 kg of terephthaldialdehyde are homogeneously mixed into 4.87 kg of a PMMA of the M546 type for 1.5 hours, using a ball mill. The balls are sieved, and the powder is processed in a 3D printing machine. A solvent mixture comprising 50 wt % benzyl alcohol, 25 wt % hexylacetate and 25 wt % 2-propanol is used as the binder system.

Following the preparations, the materials are processed in a 3D printer. The added binder is preferably between 5 wt % and 40 wt %, preferably between 8 wt % and 15 wt %, particularly preferably between 9 wt % and 11 wt %.

The components remain in the powder bed under environmental conditions for 5 to 24 hours after the last applied layer has been printed. They may then be safely removed from the powder bed without any deformation.

The components are then stored at 40° C. to 50° C. for 3 to 7 hours, preferably for 4 to 5 hours. Solidities on the PMMA base material of 6.5 MPa and a modulus of elasticity of 750 MPa have been measured. The body achieved in this manner is porous.

The invention claimed is:

1. A method comprising:
   i) depositing a layer of a first material including a particulate material in a build space;
   ii) selectively depositing a second material; over the layer of the first material;
   iii) reacting a diamine compound and a dicarbonyl compound in a condensation reaction for bonding a portion of the particulate material; and
   iv) repeating steps i), ii), and iii) repeatedly until a desired model is obtained.

2. The method of claim 1, wherein the method includes removing the condensation product.

3. The method of claim 2, wherein the step of reacting includes forming a poly-Schiff base.

4. The method of claim 3, wherein the first material includes the dicarbonyl compound and the second material includes the diamine compound.

5. The method of claim 3, wherein the first material includes the diamine compound and the second material includes the dicarbonyl compound.

6. The method of claim 3, wherein the first material includes solid particles of the diamine compound and includes different solid particles of the dicarbonyl compound.

7. The method of claim 3, wherein the second material is applied via a print head.

8. The method of claim 1, wherein the dicarbonyl compound is a liquid dicarbonyl compound.

9. The method of claim 1, wherein the dicarbonyl compound is a solid dicarbonyl compound and is placed in a carrier solution.

10. The method of claim 1, wherein the diamine compound is a solid diamine compound and is placed in a carrier solution.

11. The method of claim 1, wherein the diamine compound is a liquid diamine compound.

12. The method of claim 3, wherein the particulate material includes a polymethyl methacrylate powder or a polyamide powder.

13. The method of claim 1, wherein the second material includes a carrier solution, wherein the carrier solution includes an alcohol, an ester, or both.

14. The method of claim 1, wherein the diamine is present in a quantity from 5 to 15 weight percent.

15. The method of claim 1, wherein the dicarbonyl compound is present as a metal salt.

16. The method of claim 1, wherein
   i) the diamine compound is a solid compound and the method includes bringing the diamine compound into solution; and/or
   ii) the dicarbonyl compound is a solid compound and the method includes bringing the dicarbonyl compound into solution.

17. The method of claim 1, wherein the condensation reaction produces water and the process includes removing the water.

18. The method of claim 1, wherein the diamine compound includes an aliphatic diamine compound and/or an aromatic diamine compound.

19. The method of claim 1, wherein
   the condensation reaction produces water and the process includes removing the water;
   the second material is applied via a print head;
   the particulate material includes a polymethyl methacrylate powder or a polyamide powder;
   the second material includes a carrier solution, wherein the carrier solution includes an alcohol, an ester, or both;
   the diamine compound includes an aliphatic diamine compound and/or an aromatic diamine compound;
   the step of reacting includes forming a poly-Schiff base; and
   the first material and second material are characterized by one of the following:
   i) the first material includes the dicarbonyl compound and the second material includes the diamine compound, or
   ii) the first material includes the diamine compound and the second material includes the dicarbonyl compound; or
   iii) the first material includes solid particles of the diamine compound and includes different solid particles of the dicarbonyl compound.

20. A method comprising the steps of:
   i) depositing a layer of a first material including a particulate material in a build space;
   ii) selectively depositing a second material over the layer of the first material;
   iii) reacting a diamine compound and a dicarbonyl compound in a condensation reaction for bonding a portion of the particulate material; and
   iv) repeating steps i), ii), and iii) repeatedly until a desired model is obtained;
   wherein the step of reacting is catalyzed so that the reaction can proceed at room temperature.

21. The method of claim 20, wherein the method includes removing the condensation product.

22. The method of claim 21, wherein the first material includes the dicarbonyl compound and the second material includes the diamine compound.

23. The method of claim 21, wherein the first material includes the diamine compound and the second material includes the dicarbonyl compound.

24. The method of claim 21, wherein the first material includes solid particles of the diamine compound and the first material further includes different solid particles of the dicarbonyl compound.

25. The method of claim 21, wherein the second material is applied via a print head.

26. The method of claim 1, wherein the dicarbonyl compound is a diketone.

27. The method of claim 1, wherein the dicarbonyl compound is a metal complex of a diketone.

28. The method of claim 1, wherein the dicarbonyl compound is a liquid acetylacetone, a 2,5-hexanedione, a copper(II) acetylacetone, or a solid iron (III) acetylacetone.

29. The method of claim 1, wherein the dicarbonyl compound is a liquid dialdehyde or a solid phthaldialdehyde.

30. The method of claim 1, wherein the dicarbonyl compound is a glyoxal, a glutaraldehyde, an isopthaldialdehyde, or a terephthaldialdehyde.

31. The method of claim 1, wherein the diamine is an aliphatic diamine or an aromatic diamine.

32. The method of claim 1, wherein the diamine is a primary diamine alkane.

33. The method of claim 1, wherein the diamine is diaminododecane, diaminohexadecane, spermine, phenylenediamine, a diaminobenzoic acid, ethylenediamine, or propylenediamine.

34. The method of claim 1, wherein the diamine is a 3,5-diaminobenzoic acid and/or the dicarbonyl compound is a terephthaldialdehyde.

* * * * *